United States Patent Office 2,996,414
Patented Aug. 15, 1961

2,996,414
STERILIZING GLASS FOOD CONTAINERS
Francois Cardey and Albert Boudier, Paris, France, assignors to Societe d'Electro-Chimie d'Electro-Metallurgie et des Acieries Electriques d'Ugine, Paris, France, a corporation of France
No Drawing. Filed Jan. 22, 1960, Ser. No. 3,982
Claims priority, application France Jan. 29, 1959
3 Claims. (Cl. 134—27)

This invention relates to a process of sterilizing food containers made of glass and like materials.

It is known to clean and to disinfect bottles or other glass containers intended to receive food substances by treating them with alkaline solutions. There are several different processes using, in general, the detergent and disinfectant properties of an aqueous caustic soda solution. If desired, such solution may contain other alkaline materials. This treatment can be followed by neutralizing with a dilute hydrochloric acid solution and by water rinsing. These methods allow one to obtain containers with a perfectly satisfactory appearance but it is rare to obtain total sterility after rinsing, and the presence of spores or bacilli which have resisted the action of the materials used is nearly always revealed.

The present invention overcomes these objectionable features of prior known methods.

The process relates to sterilizing glass food containers, for example, bottles, which are intended to receive mineral waters. It comprises washing them with an aqueous caustic soda or other alkaline solution, rinsing them, treating them with an aqueous hydrochloric acid solution containing chlorine dioxide, thereby not only neutralizing the alkaline solution but also sterilizing the bottles, and thereafter rinsing them with water sterilized by a treatment with chlorine dioxide or with water sterilized by a treatment with chlorine dioxide and chlorine.

A preferred method of carrying out the process is illustrated by the following example which employs steps 1, 2(a), 2(b), 2(c), 2(d) and 3.

EXAMPLE (1) The receptacles to be treated are soaked in an aqueous caustic soda solution having a concentration of 12 g./l. at a temperature of 45° C.

(2) Then there is injected into each receptacle successively:

(a) The same caustic soda solution at the same temperature, (b) A caustic soda solution having a concentration of 15 g./l. at a temperature of 65° C., (c) Water at a temperature of 40° C., and (d) An aqueous solution having a concentration of 3% hydrochloric acid and having dissolved therein sodium chlorite in an amount to produce, by reaction with the hydrochloric acid, a chlorine dioxide concentration of 0.3 mg./l. at a temperature of 20° C.

(3) The receptacle is rinsed at ordinary temperature (20° C.) with water sterilized by a treatment with chlorine dioxide or with a mixture of chlorine and chlorine dioxide.

In step 2(d), the 3% concentration of hydrochloric acid and the concentration of 0.3 mg./l. of chlorine dioxide are optimum values. The concentration of hydrochloric acid can be between about 1 and 5% by weight and the concentration of chlorine dioxide can be between about 0.1 mg./l. and 0.5 mg./l.

The chlorine dioxide utilized in step 3 of the example is produced, for instance, from gaseous chlorine in excess and sodium chlorite according to the reaction:

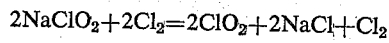
$$2NaClO_2 + 2Cl_2 = 2ClO_2 + 2NaCl + Cl_2$$

A process carried out according to the example and using appropriate apparatus allows one to obtain total sterility of the treated containers, as is shown by the fact that there is no microbial development on a nutrient gelatin film deposited on the interior surface of the container and incubated at a temperature suitable for development of microbes if such were present. Whereas, according to the usual standards in France and abroad, a container is considered as aseptic if it contains not more than 1 germ per cc. of container capacity, the process according to the present invention shows practically no germs in bottles having a capacity of 900 cc.

Tables I and II hereinafter given show the results of bacteriological analysis obtained on the following five series of tests, A, B, C, D and E, each series of tests comprising ten bottles numbered from 1 to 10, each bottle of a given series being treated by the same method.

A. Dirty bottles before washing.

B. Bottles washed by the following sequence of steps as hereinabove designated in the example: 1, 2(a), 2(b), 2(c) and 3 (but rinsing with water not treated with chlorine dioxide).

C. Bottles washed by the following sequence of steps as hereinabove designated in the example: 1, 2(a), 2(b), 2(c), rinsing with an aqueous 3% hydrochloric solution at 20° C., and 3 (but rinsing with water not treated with chlorine dioxide).

D. Bottles washed by the following sequence of steps as hereinabove designated in the example: 1, 2(a), 2(b), 2(c), 2(d) and 3 (but rinsing with water not treated with chlorine dioxide).

E. Bottles washed by the following sequence of steps as hereinabove designated in the example: 1, 2(a), 2(b), 2(c), 2(d) and 3.

Unwashed bottles (series A)

The results obtained on the unwashed bottles are shown in Table I.

TABLE I

| Bottle No. | (1) 20° C. after 24 hrs., 48 hrs., etc. for 5 days | (2) | (3) 37° C. after 24 hrs. | (4) |
|---|---|---|---|---|
| | 1 ml. | 0.1 ml. | 1 ml. | 0.1 ml. |
| A1 | 0—incomputable | 0—incomputable | incomputable | 29. |
| A2 | 2—incomputable | do | do | 3,032. |
| A3 | 1—incomputable | do | do | 300. |
| A4 | 0—96—incomputable | 0—40—incomputable | do | incomputable. |
| A5 | 0—incomputable | 0—115—incomputable | 30 | 5. |
| A6 | 0—147—incomputable | 0—15—incomputable | 68 | 11. |
| A7 | 2—incomputable | 1—incomputable | incomputable | 140. |
| A8 | incomputable | incomputable | do | incomputable. |
| A9 | 0—3—58—176+mustiness | 0—0—9—14+mustiness | 1 | 0. |
| A10 | incomputable | 0—incomputable | incomputable | 1,344. |

In obtaining the results shown in Table I, each of the bottles was treated as follows.

10 ml. of a Ringer solution diluted with water at a ratio of 1 to 4 was introduced into the empty bottle, the bottle was shaken and either 1 ml. or 0.1 ml., as the case may be, of this solution was taken off and incubated with a nutrient gelatin medium known as "Tryptose," and the number of germs was counted. According to columns (1) and (2) of Table I, the incubation temperature was 20° C. and the incubation period was 5 days, and a count of the number of germs was made every 24 hrs. up until the time when the count became incomputable. Columns (3) and (4) of Table I show the results obtained after incubation for 24 hrs. at a temperature of 37° C.

In columns (1) and (2) of Table I:

First figure, number of germs after 24 hrs.
Second figure, number of germs after 48 hrs.
Third figure, number of germs after 3 days
Fourth figure, number of germs after 4 days In explanation of these designations, reference is made for purposes of illustration to bottle No. A9. Table I shows that for bottle A9 the number of germs in this bottle after incubation for 24 hrs. was 0, there were 3 germs in the bottle after 48 hrs. of incubation, 58 germs after 3 days of incubation and 176 germs after 4 days of incubation.

*Washed bottles (series B, C, D and E)*

Reference is now made to Table II which shows the results obtained on washed bottles (series B, C, D and E), and series B, C and D being according to prior known processes whereas series E is according to the present invention.

TABLE II

| Bottle No. | Series | | | |
|---|---|---|---|---|
| | B | C | D | E |
| | | | | Germs |
| 1 | incomputable | 14 | 3 germs among which 1 bacillus | 0 |
| 2 | do | 18 | 5 germs among which 1 bacillus | 1 |
| 3 | do | 5 | 6 | 0 |
| 4 | do | 9 | 4 | 0 |
| 5 | do | 6 | 2 | 1 |
| 6 | do | 10 | 2 germs among which 1 bacillus | 0 |
| 7 | do | 18 | 5 | 0 |
| 8 | do | 4 | 1 | 0 |
| 9 | do | 4 | 7 | 0 |
| 10 | do | 5 | 5 germs among which 1 bacillus | 0 |

A bottle which had been washed according to one of the methods B, C, D or E was treated by covering its inner surface with a "Tryptose" film, the bottle was maintained at 20° C. for 5 days and at the end of this period the number of the germs in the bottle was counted.

From a comparison of the results shown in Table II, it can be seen that applicants' method (method E) produced results which were distinctly superior to those produced by methods B, C or D which are not in accordance with the present invention.

The invention is not limited to the preferred embodiment but may be otherwise embodied or practiced within the scope of the following claims.

We claim:

1. The process of sterilizing glass food containers, which comprises washing them with an aqueous caustic soda solution, rinsing them with water, treating them with an aqueous hydrochloric acid solution containing chlorine dioxide, and rinsing them with water sterilized by a treatment with chlorine dioxide.

2. The process of sterilizing glass food containers, which comprises washing them with an aqueous caustic soda solution, rinsing them with water, treating them with an aqueous solution containing about 1 to 5% by weight of hydrochloric acid and containing about 0.1 mg./l. to 0.5 mg./l. of chlorine dioxide, and rinsing them with water sterilized by a treatment with chlorine dioxide.

3. The process of sterilizing glass food containers, which comprises washing them with an aqueous caustic soda solution, rinsing them with water, treating them with an aqueous solution containing about 3% of hydrochloric acid and about 0.3 mg./l. of chlorine dioxide, and rinsing them with water sterilized by a treatment with chlorine dioxide.

References Cited in the file of this patent

UNITED STATES PATENTS

| 1,642,419 | Loew | Sept. 13, 1927 |
| 2,452,970 | Vincent | Nov. 2, 1948 |
| 2,514,304 | Bacon et al. | July 4, 1950 |

FOREIGN PATENTS

| 530,010 | Italy | July 2, 1955 |

OTHER REFERENCES

Journal of Chemical Education, vol. 22, No. 6, June 1945, pages 283–285 relied on.